(12) United States Patent
Kontorinis et al.

(10) Patent No.: US 11,599,184 B2
(45) Date of Patent: Mar. 7, 2023

(54) THROUGHPUT-OPTIMIZED, QUALITY-OF-SERVICE AWARE POWER CAPPING SYSTEM

(71) Applicant: Google LLC, Mountain View, CA (US)

(72) Inventors: Vasileios Kontorinis, Mountain View, CA (US); Shaohong Li, Santa Clara, CA (US); Xiao Zhang, San Jose, CA (US); Sreekumar Vadakke Kodakara, Campbell, CA (US); Kunqi Ye, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/243,853

(22) Filed: Apr. 29, 2021

(65) Prior Publication Data

US 2021/0373639 A1 Dec. 2, 2021

Related U.S. Application Data

(60) Provisional application No. 63/030,639, filed on May 27, 2020.

(51) Int. Cl.
| | |
|---|---|
| *G06F 1/26* | (2006.01) |
| *G06F 1/32* | (2019.01) |
| *G06F 1/329* | (2019.01) |
| *G06F 9/48* | (2006.01) |
| *G06F 9/50* | (2006.01) |

(52) U.S. Cl.
CPC ............ *G06F 1/329* (2013.01); *G06F 9/4893* (2013.01); *G06F 9/5094* (2013.01)

(58) Field of Classification Search
CPC ....... G06F 1/329; G06F 9/4893; G06F 9/5094
See application file for complete search history.

(56) References Cited

U.S. PATENT DOCUMENTS

| | | | | |
|---|---|---|---|---|
| 7,707,443 | B2 * | 4/2010 | Chheda ................ | G06F 1/3203 |
| | | | | 713/320 |
| 9,250,684 | B1 * | 2/2016 | Chen ..................... | G06F 1/3206 |
| 10,481,659 | B2 * | 11/2019 | Gambon .............. | G06F 1/3206 |
| 2017/0255243 | A1 * | 9/2017 | Gambon .............. | G06F 1/3206 |

FOREIGN PATENT DOCUMENTS

EP 3062192 A1 8/2016

OTHER PUBLICATIONS

Extended European Search Report for European Patent Application No. 21175697.8 dated Oct. 26, 2021. 18 pages.

* cited by examiner

*Primary Examiner* — Zhipeng Wang
(74) *Attorney, Agent, or Firm* — Lerner, David, Littenberg, Krumholz & Mentlik, LLP

(57) ABSTRACT

This disclosure describes a method to minimize disruption for throughput oriented jobs in power oversubscription services with a dynamic control. The mechanism controls power in a hardware-agnostic way, and the policy employs a multi-threshold approach that balances power safety with workload impact. Moreover, an alternative control mechanism ensures proper system operation while power measurements are unavailable.

19 Claims, 8 Drawing Sheets

THROUGHPUT-OPTIMIZED, QUALITY-OF-SERVICE AWARE POWER CAPPING SYSTEM

CROSS-REFERENCE TO RELATED APPLICATIONS

The present application claims the benefit of the filing date of U.S. Provisional Patent Application No. 63/030,639 filed May 27, 2020, the disclosure of which is hereby incorporated herein by reference.

BACKGROUND

Data centers form the backbone of popular online services such as search, streaming video, email, social networking, online shopping, and cloud. The growing demand for online services forces hyperscale providers to commit massive capital into continuously expanding their data center fleet. The majority of such investments are allocated towards buying and building infrastructure, such as buildings, power delivery, and cooling, to host the servers that compose the warehouse-scale computer.

Power oversubscription is the practice of deploying more servers in a data center than the data center can nominally support if all servers were 100% utilized. It grows power capacity in-place for existing data centers and reduces future data center builds. On the other hand, power oversubscription comes with a risk of overload during power peaks, and thus often comes with protective systems such as power capping. Power capping systems enable safe power oversubscription by preventing overload during power emergencies. Power capping actions include suspending low-priority tasks, throttling CPU voltage and frequency using techniques such as dynamic voltage and frequency scaling (DVFS) and running average power limit (RAPL), or packing threads in a subset of available cores. The action needs to be compatible with workloads and meet service-level objectives (SLOs). This, however, is challenging for clusters with throughput-oriented workloads co-located with latency-sensitive workloads.

Throughput-oriented tasks represent an important class of computation workloads. Examples are web indexing, log processing, and machine learning model training. These workloads typically have deadlines in hours for when the computation needs to be completed, making them good candidates for performance throttling when a cluster faces a power emergency due to power oversubscription. Nevertheless, missing the deadline can result in serious consequences such as lost revenue and diminished quality, thus making them less amenable to interruption.

Latency-sensitive workloads are a different class. They need to complete the requested computation in milliseconds to seconds. A typical example is a job that handles user requests. High latencies result in bad user experience, eventually leading to loss of users and revenue. Unlike throughput-oriented pipelines, such jobs are not amenable to performance throttling. They often are considered high priority and need to be exempt from power capping. Throughput-oriented and latency-sensitive jobs are often co-located on the same server to increase resource utilization. This poses a great challenge for power capping due to the need for fine-grained power capping mechanisms.

BRIEF SUMMARY

One aspect of the disclosure provides a method, including receiving, by one or more processors, power measurements for a plurality of machines in a datacenter, the plurality of machines executing one or more tasks, identifying power limitations for the plurality of machines, comparing, by the one or more processors, the received power measurements against the power limitations for the plurality of machines, determining, based on the comparison, whether to shed power consumed by the plurality of machines, and commanding, by the one or more processors, the plurality of machines to operate in accordance with one or more restrictions to reduce power consumption.

According to some examples, the method may further include identifying a first threshold, and identifying a second threshold higher than the first threshold, wherein determining whether to shed power comprises determining whether the received power measurements meet or exceed the second threshold, and wherein commanding the plurality of machines to operate in accordance with one or more restrictions comprises sending a command to reduce power consumption by a first predetermined percentage. Determining whether to shed power may include determining whether the received power measurements exceed the first threshold only during a predetermined period of time after the second threshold has been met or exceeded. When the first threshold is met or exceeded during the predetermined period of time, the method further may further include sending a second command to the plurality of machines to reduce power consumption by a second predetermined percentage that is lower than the first predetermined percentage.

According to some examples, the measurements may be received from one or more power meters coupled to the plurality of machines.

Commanding the plurality of machines to operate in accordance with the one or more restrictions may include restricting processing time of a task inside a machine level scheduler for all the machines in a power domain. Restricting the processing time may include applying a first multiplier for low priority tasks, wherein the first multiplier is selected to prevent the low priority tasks from running and consuming power. In some examples, the method may further include applying a second multiplier for the low priority tasks. One or more high priority tasks may be exempt from the limitations.

According to some examples, the method may further include limiting a number of available schedulable processor entities to control power when the power measurements become unavailable.

Commanding the plurality of machines to operate in accordance with one or more restrictions may include making a portion of processing components of each of the plurality of machines unavailable to tasks.

Another aspect of the disclosure provides a system including one or more processors in communication with a plurality of machines executing one or more tasks. The one or more processors may be configured to receive power measurements for the plurality of machines, identify power limitations for the plurality of machines, compare the received power measurements against the power limitations for the plurality of machines, determine, based on the comparison, whether to shed power consumed by the plurality of machines, and command, by the one or more processors, the plurality of machines to operate in accordance with one or more restrictions to reduce power consumption.

The one or more processors may be further configured to identify a first threshold, and identify a second threshold higher than the first threshold, wherein determining whether to shed power comprises determining whether the received power measurements meet or exceed the second threshold, and wherein commanding the plurality of machines to operate in accordance with one or more restrictions comprises sending a command to reduce power consumption by a first predetermined percentage. Determining whether to shed power may include determining whether the received power measurements exceed the first threshold only during a predetermined period of time after the second threshold has been met or exceeded. When the first threshold is met or exceeded during the predetermined period of time, the one or more processors may be further configured to send a second command to the plurality of machines to reduce power consumption by a second predetermined percentage that is lower than the first predetermined percentage.

According to some examples, the measurements may be received from one or more power meters coupled to the plurality of machines.

Commanding the plurality of machines to operate in accordance with the one or more restrictions may include restricting processing time of a task inside a machine level scheduler for all the machines in a power domain. In restricting the processing time the one or more processors may be configured to apply a first multiplier for low priority tasks, wherein the first multiplier is selected to prevent the low priority tasks from running and consuming power. The one or more processors may be configured to exempt one or more high priority tasks from the limitations.

In some examples, commanding the plurality of machines to operate in accordance with one or more restrictions may include making a portion of processing components of each of the plurality of machines unavailable to tasks.

Yet another aspect of the disclosure provides a non-transitory computer-readable medium storing instructions executable by one or more processors for performing a method, comprising receiving power measurements for a plurality of machines in a datacenter, the plurality of machines executing one or more tasks, identifying power limitations for the plurality of machines, comparing the received power measurements against the power limitations for the plurality of machines, determining, based on the comparison, whether to shed power consumed by the plurality of machines, and commanding, the plurality of machines to operate in accordance with one or more restrictions to reduce power consumption.

DETAILED DESCRIPTION

The present disclosure provides a system and method for throttling the CPU shares of throughput-oriented workloads to slow them down just enough to keep power under specified budget, while leaving latency-sensitive jobs unaffected. The system architecture enables oversubscription across large power domains. Power pooling and statistical multiplexing across machines in large power domains maximizes the potential for power oversubscription. Moreover, the system implements mechanisms and policies for power throttling with wide applicability. The system may be designed to rely only on established Linux kernel features, and thus be hardware platform agnostic. This enables the flexibility of introducing a variety of platforms into data centers without compromising the effectiveness of power capping.

Task-level mechanisms allow differentiated Quality-of-Service (QoS). Specifically, the system does not affect serving latency-sensitive workloads co-located with throughput-oriented workloads, and has the ability to apply different CPU caps on workloads with different SLOs. The platform-agnostic and QoS-aware nature allows the system to be tailored to a wide spectrum of hardware platforms and software applications.

The system is advantageous in that it achieves power safety while minimizing performance impact. A two-threshold scheme enables minimal performance impact while ensuring that a large amount of power can be shed to avoid power overloading during emergencies. The system focuses on availability, introducing a failover subsystem to maintain power safety guarantees in the face of power telemetry failure.

The system is capable of performing two types of end-to-end power capping actuation tailored to throughput-oriented workloads: a primary mechanism called reactive capping, and a failover mechanism called proactive capping. Reactive capping monitors real-time power signals read from power meters and reacts to high power measurements by throttling workloads. When power signals become unavailable, e.g., due to meter downtime, proactive capping takes over and assesses risk of breaker trips. The assessment is based on factors such as power in the recent past and for how long the signals have been unavailable. If risk is deemed high, it proactively throttles tasks.

Architecture and Implementation

Figure 1A:
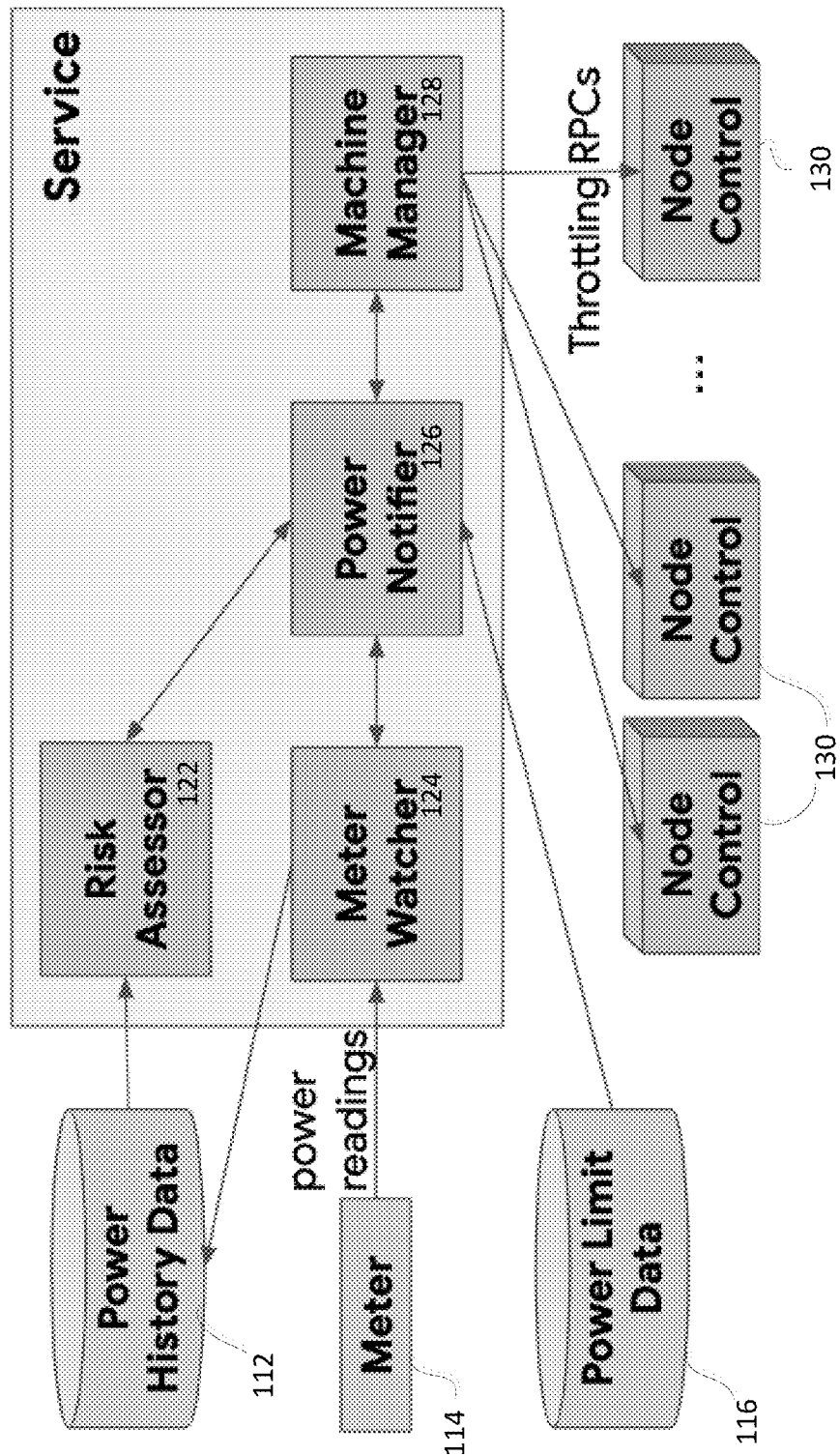
FIG. 1A is a block diagram illustrating an example software architecture of a system according to aspects of the disclosure.

FIG. 1A illustrates an example software architecture of the system. As shown, the architecture includes a meter watcher module 124, a power notifier module 126, a risk assessor module 122, and a machine manager module 128. The meter watcher module 144 polls power readings from meters 114. For example, the meter watcher module 144 may poll at a rate of one reading per second, multiple readings per second, one reading every few seconds, or the like. The meter watcher module 144 passes the readings to the power notifier module 126 and also stores a copy in a power history datastore 112.

The power notifier 126 is a central module that implements the control logic of reactive and proactive capping. When power readings are available, it uses the readings for the reactive capping logic. When the readings are unavailable, it queries the risk assessor module 122 for the proactive capping logic.

The risk assessor 122 uses the historical power information from the power history datastore 112 to assess the risk of breaker trips. If either logic decides to cap, the power notifier 126 will pass appropriate capping parameters to the machine manager module 128. For example, the power capping parameters may be received from power limit database 116. The machine manager module 128, in response, sends load shaping requests to one or more node controllers 130 associated with individual machines. The load shaping requests may be sent in the form of remote process call (RPC) or any other message or communication format. According to some examples, the RPCs may be sent to multiple node controllers 130 concurrently. The RPCs may include commands which cause the individual machines to reduce power.

According to some examples, a load-shaping request may include fields such as a maximum priority of jobs to be throttled, a multiplier used to hardcap the usage of lower priority jobs, and a duration of time for which to cap the jobs. The request may also include instructions whether the multiplier should be applied to CPU limit only, or to a sustained CPU rate.

When a new load shaping request is received, the node controller 130 checks if there is already an ongoing load-shaping event. If there is not already an ongoing event, the new request may be accepted. If there is already an ongoing event, the new request may be accepted if it is more aggressive in terms of its power reduction effect. For example, the new RPC may be more aggressive if it has higher maximum throttling priority or lower hardcapping multiplier, or if it switches from applying the multiplier from CPU limit only to sustained CPU rate.

The scale of a power domain can vary from a few megawatts to tens of megawatts, depending on the power architecture of data centers. One instance of the system may be deployed for each protected power domain. The instance may be replicated for fault tolerance. For example, there are 4 replicas in a 2-master, 2-slave configuration. The master replicas can read power meters and issue power shedding RPCs. The power shedding RPC services are designed to be idempotent and can handle duplicate RPCs from different master replicas. Two identical master replicas may be used to ensure power shedding is available even during master election periods. Slaves take over when masters become unavailable.

Figure 1B:
FIG. 1B is a block diagram illustrating an example system according to aspects of the disclosure.
Figure 1B:
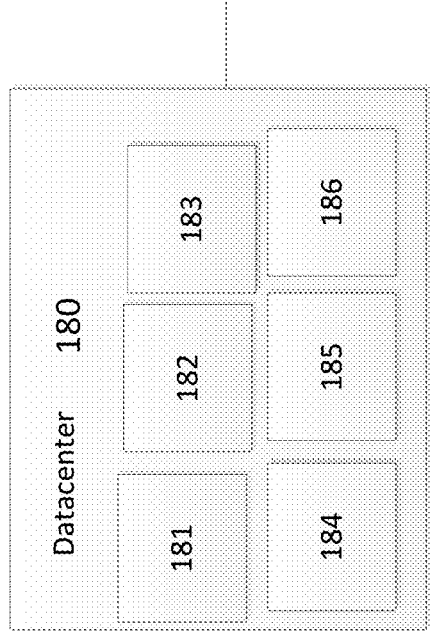

FIG. 1B illustrates an example system including a server device, such as controller 190, on which the system may be implemented. The controller 190 may include hardware configured to manage load-shaping and throttling for devices in datacenter 180. According to one example, the controller 190 may reside within and control a particular datacenter. According to other examples, the controller 190 may be coupled to one or more datacenters 180, such as through a network, and may manage operations of multiple datacenters.

The datacenter 180 may be positioned a considerable distance from the controller 190 and/or other datacenters (not shown). The datacenter 180 may include one or more computing devices, such as processors, servers, shards, cells, or the like. In some examples, the computing devices in the datacenter may have different capacities. For example, the different computing devices may have different processing speeds, workloads, etc. While only a few of these computing devices are shown, it should be understood that each datacenter 180 may include any number of computing devices, and that the number of computing devices in a first datacenter may differ from a number of computing devices in a second datacenter. Moreover, it should be understood that the number of computing devices in each datacenter 180 may vary over time, for example, as hardware is removed, replaced, upgraded, or expanded.

In some examples, the controller 190 may communicate with the computing devices in the datacenter 180, and may facilitate the execution of programs. For example, the controller 190 may track the capacity, status, workload, or other information of each computing device, and use such information to assign tasks. The controller 190 may include a processor 198 and memory 192, including data 194 and instructions 196. In other examples, such operations may be performed by one or more of the computing devices in the datacenter 180, and an independent controller may be omitted from the system.

The controller 190 may contain a processor 198, memory 192, and other components typically present in server computing devices. The memory 192 can store information accessible by the processor 198, including instructions 196 that can be executed by the processor 198. Memory can also include data 194 that can be retrieved, manipulated or stored by the processor 198. The memory 192 may be a type of non-transitory computer readable medium capable of storing information accessible by the processor 198, such as a hard-drive, solid state drive, tape drive, optical storage, memory card, ROM, RAM, DVD, CD-ROM, write-capable, and read-only memories. The processor 198 can be a well-known processor or other lesser-known types of processors. Alternatively, the processor 198 can be a dedicated controller such as an ASIC.

The instructions 196 can be a set of instructions executed directly, such as machine code, or indirectly, such as scripts, by the processor 198. In this regard, the terms "instructions," "steps" and "programs" can be used interchangeably herein. The instructions 196 can be stored in object code format for direct processing by the processor 198, or other types of computer language including scripts or collections of independent source code modules that are interpreted on demand or compiled in advance.

The data 194 can be retrieved, stored or modified by the processor 198 in accordance with the instructions 196. For instance, although the system and method is not limited by a particular data structure, the data 194 can be stored in computer registers, in a relational database as a table having a plurality of different fields and records, or XML documents. The data 194 can also be formatted in a computer-readable format such as, but not limited to, binary values, ASCII or Unicode. Moreover, the data 194 can include information sufficient to identify relevant information, such as numbers, descriptive text, proprietary codes, pointers, references to data stored in other memories, including other network locations, or information that is used by a function to calculate relevant data.

Although FIG. 1B functionally illustrates the processor 198 and memory 192 as being within the same block, the processor 198 and memory 192 may actually include multiple processors and memories that may or may not be stored within the same physical housing. For example, some of the instructions 196 and data 194 can be stored on a removable CD-ROM and others within a read-only computer chip. Some or all of the instructions and data can be stored in a location physically remote from, yet still accessible by, the processor 198. Similarly, the processor 198 can actually include a collection of processors, which may or may not operate in parallel.

Reactive Capping with CPU Bandwidth Control

The CPU usage is a good proxy for the CPU power consumed by a running task. According to some examples, the CPU Bandwidth Control feature of the Linux® Completely Fair Scheduler (CFS) kernel scheduler may be used to precisely control the CPU usage of the tasks running in a node, thus allowing control of the power consumed by the node.

Individual tasks may be running inside their own control groups (cgroups). The scheduler provides two parameters in a cgroup, namely quota and period. Quota controls the amount of CPU time the workload gets to run during a period. It is shared among CPUs in the system. The quota and period can be set for each cgroup and are typically specified at millisecond granularity. A separate (per cgroup and per CPU), cumulative runtime_remaining variable is kept inside the kernel. Cumulative runtime_remaining is consumed when a thread is running. When it reaches zero the running thread is descheduled and no thread in the cgroup can run until runtime is replenished at the beginning of the next period. Historical CPU usage of all workloads running in the machine may be tracked. During a power event, every node in the power domain may receive an RPC call to throttle throughput-oriented workloads.

The RPC call contains parameters about how much the CPU usage of the tasks should be reduced. The node controller that receives the RPC call uses the historical CPU usage of all throughput oriented workloads to determine the CPU time to throttle. The new quota and period values are then calculated for each cgroup and written to the cgroups in the machine. QoS differentiation is achieved by grouping tasks of different priorities into different cgroups. In our implementation, throughput-oriented tasks are assigned low priorities and latency-sensitive tasks are assigned high priorities. CPU Bandwidth Control is applied to cgroups of low-priority tasks, exempting cgroups of high-priority tasks.

CPU Bandwidth Control is advantageous, compared to DVFS and RAPL, in that it is platform-agnostic and has per-cgroup control. To ensure CPU Bandwidth Control achieves expected power reduction, it may be used in conjunction with power metering and negative feedback. The relation between CPU bandwidth throttling and power consumption is still monotonic, thus the feedback loop can be made stable. CPU jailing is another mechanism which may be used to limit power consumption during a power meter outage. CPU jailing has a more predictable throttling power relation suitable for an open loop control.

Control Policy: Load Shaping

Figure 2A:
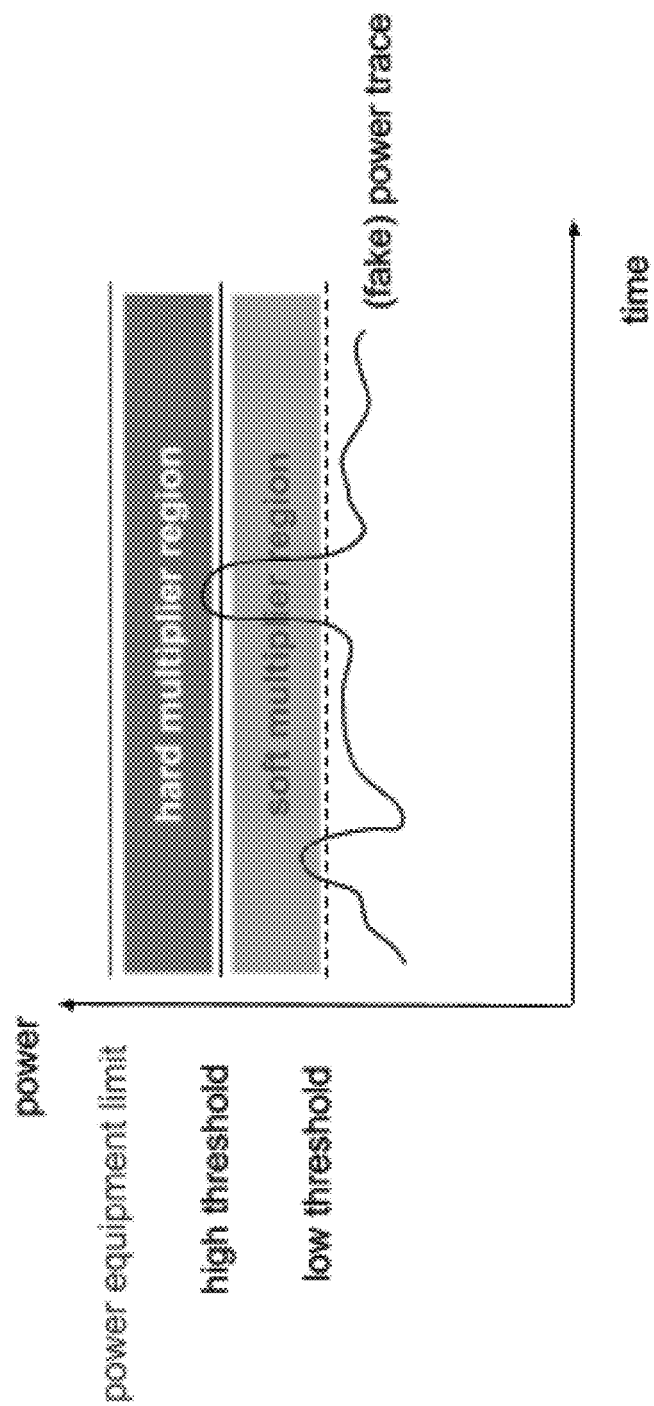
FIGS. 2A-B are graphs illustrating example load shaping policies according to aspects of the disclosure.

A variety of different load shaping control policies are available. According to a first policy, shown in FIG. 2A, a multiplier is applied when a threshold is reached, for both low and high thresholds. For example, a soft multiplier is applied when power reaches the low threshold. If power keeps increasing and reaches the high threshold, a hard multiplier is applied.

The multiplier may be, for example, a number between 0 and 1 that is applied to reduce power consumed by individual machines, such as by reducing a number of jobs performed by the individual machines at a given time. For example, a multiplier close to 0, such as 0.01, may reduce power quickly by reducing 99% of the tasks on the individual machine at the given time. Such a multiplier may be referred to as a "hard" or "high impact" multiplier. Conversely, a multiplier close to 1, such as 0.9 or 0.75, may reduce power and also minimize performance impact by reducing a lower percentage of the tasks performed by the individual machines. Such a multiplier may be referred to as a "soft" or "low impact" multiplier.

The multiplier may be applied to a CPU limit, a sustained CPU rate, a number of lower priority jobs, etc. For example, the multiplier may restrict a processing time of a task inside a machine level scheduler for all the machines in a power domain. For example, the multiplier may restrict the time during which a task can access the CPU. The multiplier may be applied only to lower priority tasks, and higher priority tasks are exempt.

Figure 2B:
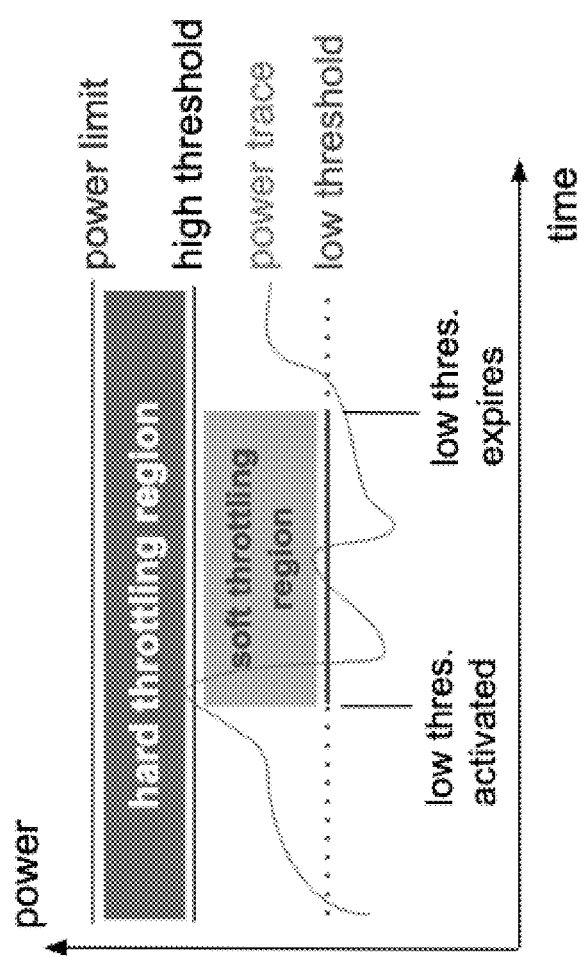

FIG. 2B illustrates a second load shaping control policy which uses the power meter readings as input to determine when to throttle workloads and by how much. A multiplier parameter is predetermined for the throttling actions. When throttling starts, the node controllers receive RPC calls that contain the multiplier and sets a CPU cap for each affected task, calculated by $$cap = multiplier * CPUavg$$

where CPUavg is the task's average CPU usage over the last 10 seconds. The cap is updated every second for the whole period when throttling is active. The effect is that a task's CPU cap reduces exponentially with time at a rate roughly equal to the multiplier if the task consumes CPU up to its cap. This penalizes tasks fairly, proportional to their CPU usage.

The policy aims to strike a balance between power safety and performance impact. It achieves this by maintaining two power thresholds, a higher one that is close to the equipment limit the system protects, such as 98% of the limit, and a lower one such as at 96% of the limit. The higher threshold is associated with a "hard" or "high impact" multiplier close to 0, such as 0.01, aiming to reduce power quickly to ensure safety. The lower threshold is associated with a "soft" or "low impact" multiplier close to 1, such as 0.9 or 0.75, aiming to minimize performance impact even though power may temporarily exceed the lower threshold.

According to some examples, the lower threshold is not activated until throttling is triggered, and it is deactivated after throttling has not been active for a while. This way, power is allowed to reach the range between the two thresholds without throttling. More specifically, before any throttling happens, the higher threshold is active but the lower one is not. The first throttling event only happens if power reaches the higher threshold. The lower threshold is activated once power reaches the higher threshold, and expires after a specified duration when power is below the lower threshold and no throttling occurs.

Throttling stops when power decreases to be below the lowest active threshold. If all tasks are unthrottled simultaneously, power may surge and quickly reach the threshold again causing unnecessary oscillations, or even reach a risky level before Load Shaping takes effect. To avoid these undesired effects, the system is designed to stop in a progressive manner Each machine is assigned a randomized throttling timeout in the range of [timeout_min, timeout_max]. When throttling stops, machines are progressively unthrottled according to their timeout. This smooths out the power ramp-up curve. In one example implementation, RPC calls may be sent every second to extend the timeout until power is below the threshold. A repeatedly refreshed timeout may be used instead of a stop-throttling RPC because RPCs may be dropped and fail to reach the machines.

The load shaping parameters, such as the higher threshold and the associated hard multiplier, the lower threshold and the associated soft multiplier, the expiration of the lower threshold, and the throttling timeout range, may be predetermined. The thresholds and the multipliers may be chosen to balance power safety and performance impact. The higher threshold may be close to the protected limit so throttling doesn't trigger too often, but not too close so the system has enough time to react to the incident. The hard multiplier may be close to 0 for a quick reduction of a large amount of power. The lower threshold may be similarly set to have a balance of throttling frequency and enough guard band for possible power surges. The soft multiplier may be close to 1 to minimize performance impact. The lower threshold expiration may be long enough to make the lower threshold useful, but not too long to significantly increase throttling frequency. Throttling timeout range may be set for a reasonable oscillation pattern. For example, the throttling timeout range may be approximately 1-20 seconds.

Accordingly, in implementation, as power increases the low threshold will be crossed more frequently. Frequent activations compound as a result of applying the multiplier over measured CPU utilization for a task in a moving window. Staying over the lower threshold will result in restricting CPU time by a percentage that corresponds to the soft/low impact multiplier. As such, the soft multiplier converges to the impact of the high multiplier as needed following power fluctuations of the load. The high threshold serves as an activation point for the soft multiplier. It allows the load to stay in or close to the soft multiplier region indefinitely as long as it does not cross the high threshold. The high threshold further serves to trim sudden power spikes that may happen while the low threshold is active.

The load shaping control policy determines when and how much the actuator should throttle CPU usage in order to control power. Formally, the power draw of a power domain can be written as $$p(t) = \sum_{i=1}^{N} f_i(c_i(t) + u_i(t)) + n(t) \quad (1)$$

where t is (discrete) time, p is the total power draw, N is the number of machines, $f_i$ is the power drawn by machine i as a monotonic function of the normalized machine CPU utilization (in the range of [0, 1]), $c_i$ is the CPU used by controllable tasks, $u_i$ is the uncontrollable CPU used by exempt tasks and the Linux kernel, and n is the power drawn by non-machine equipment. The CPU used by controllable tasks, $c_i$, may be capped so that p<1 for a power limit 1. Preventing overload (p>1) may be prioritized, while keeping p close to 1 when p<1 may provide for efficiency.

According to some examples, a randomized unthrottling/multiplicative decrease (RUMD) algorithm may be used. If p(t)>1, then a cap is applied for the CPU usage of each controllable task. The cap is equal to the task's previous usage multiplied by a multiplier, m, in the range of (0, 1). Then the power draw at the next time step is:

$$P(t+1) = \sum_{i=1}^{N} f_i(c_i(t+1) + u_i(t+1)) + n(t+1) \leq \sum_{i=1}^{N} f_i(mc_i(t) + u_i(t+1)) + n(t+1) \quad (2)$$

This cap may be updated frequently, such as every second, and $c_i$ decreases exponentially with time, until p<1. Because of the $u_i$ and n terms, there is no guarantee that p(t+1)<p(t). Nevertheless, implementations may provide high confidence that non-sheddable power is less than the power limit, that is $$\sum_{i=1}^{N} f_i(u_i(t)) + n(t) < 1, \forall t \quad (3)$$

Therefore power will eventually be reduced below the limit. For instance, if the system is configured to completely unthrottle all machines in 5 seconds, then a random non-overlapping set of 20% of machines will be unthrottled every second.

In some examples, the cap may be progressively lifted in an additive manner for each machine at the same time, leading to an additive increase/multiplicative decrease (AIMD) algorithm. Similar to AIMD, a RUMD algorithm also has the desirable property of being partially distributed. There is a central component and a distributed component that function largely independently. The central policy controller requires no detailed system states, such as the CPU usage and task distribution of each machine, other than the total power. The distributed node controllers can make independent decisions based solely on a few parameters that the policy controller sends to all node controllers.

Failover Mechanism: Proactive Capping

The reactive capping system depends on power signals provided by power meters installed close to the protected power equipment like circuit breakers. This differs from the more widely adopted approach of collecting power measurements from individual compute nodes and aggregating at upper levels. It has advantages of simplicity, avoiding aggregation and the associated challenges, such as time unalignment and partial collection failures, and avoiding the need to estimate power consumption by non-compute equipment, such as data center cooling, that does not provide power measurements.

Transient network issues can cause seconds to minutes of power signal interruption, while meter downtime can range from days to weeks before it gets repaired. Without power signals, a load shaping unit cannot decide how much to throttle each task with strong power guarantees. A fallback approach, referred to herein as CPU Jailing, can operate without power measurements.

According to some examples, signals may also be collected from secondary sources, such as the machines' power supply units, or from power models.

Node-Level Mechanism of CPU Jailing

CPU jailing reduces the CPU of machines available for tasks to run on by modifying their CPU affinity masks. A parameter, jailing_fraction, is predetermined, the parameter being a fraction of CPUs that are "jailed" such that they are made unavailable to tasks. The jailing_fraction may be a fraction of CPUs of each machine that are made unavailable to tasks.

It may occur that cluster operators intentionally overcommit resources and drive up machine utilization. When resource overcommitment is compounded with CPU jailing, intensive CPU resource competition is expected. Each task has a CPU limit request which translates to a share value in the Linux CFS. CFS may be leveraged to maintain proportional CPUs among tasks when available CPUs are reduced due to jailing. Certain privileged processes, such as critical system daemons, are explicitly exempt from jailing and can still run on jailed CPUs. It is because their CPU usage is very low compared to regular tasks, but the risk and consequence of the privileged system processes being CPU starved is prohibitive. For example, the risk and consequence may be that the machine cannot function correctly.

According to some examples, each jailing request comes with a time duration and can be renewed by request. Once jailing expires, previously unavailable CPUs may immediately become available to all tasks.

CPU jailing immediately caps peak power consumption as it effectively limits max CPU utilization to (1−jailing_fraction) on every single machine. Therefore it sets an upper bound for power consumption, allowing safe operation for extended time without power signals.

The jailing_fraction may be uniformly applied to individual machines, regardless of their CPU utilization. Consequently, machines with low utilization are less impacted while machines with high utilization are more impacted. When machine CPU utilization is well below (1−jailing_fraction), CPU jailing essentially does not affect tasks on these machines. A secondary effect is that jailed CPUs have higher possibility of deep sleep states due to increased idleness, which contributes to further power reduction. Note that not all jailed CPUs will enter deep sleep states all the time because exempt privileged processes and kernel threads may still have sporadic usage of them.

In some instances, CPU jailing may result in a relaxed ability to differentiate QoS. For example, the latency of a serving task can be disproportionately affected compared to the throughput of a batch task. This effect may be attenuated by the fact that latency sensitive tasks run at higher priorities and can preempt lower-priority throughput-oriented tasks. In some implementations, CPU jailing may only be employed where load shaping is not applicable.

A jailing_fraction may be determined from one or more factors, such as workloads' performance SLO, CPU-power relation, and power oversubscription. Because CPU jailing does not differentiate QoS of workloads, there is a chance that high-priority latency-sensitive jobs suffer from performance degradation under high CPU contention. The jailing_fraction, applied at the expected frequency prescribed by the control policy, should not compromise those jobs' SLO.

For power safety, power should be reduced to a safe level after a certain portion of cores are jailed. This value of jailing_fraction can be calculated from the power oversubscription level and the CPU-power relation of the given collection of hardware in the power domain.

$$J = 1 - U_{cpu} = 1 - f_{power \mapsto cpu}(1/(1+osr))$$

where J is jailing_fraction, $U_{cpu}$ is highest allowed CPU utilization, $f_{power \mapsto cpu}$ is a function to convert power utilization to CPU utilization, and osr is the oversubscription ratio defined by the extra oversubscribed power capacity as a fraction of the nominal capacity. 1/(1+osr) gives the maximum safe power utilization, which can be converted to Ucpu given that the CPU-power relation is monotonic. An example jailing_fraction may be 20%-50%.

As a fallback approach, CPU jailing may be triggered when power measurements from the meters are lost and the risk of power overloading is high. The risk is determined by two factors, predicted power consumption and meter unavailability duration. Higher predicted power consumption and longer meter unavailability means higher risk. The probability of power reaching the protected equipment limit during certain meter downtime may be predicted, based on historical data, given the power consumption of the recent past.

CPU jailing may be triggered if the probability is high due to high recent power consumption and long enough downtime.

Comparison of Node Level Mechanisms

Figures 3A, 3B, 3C:
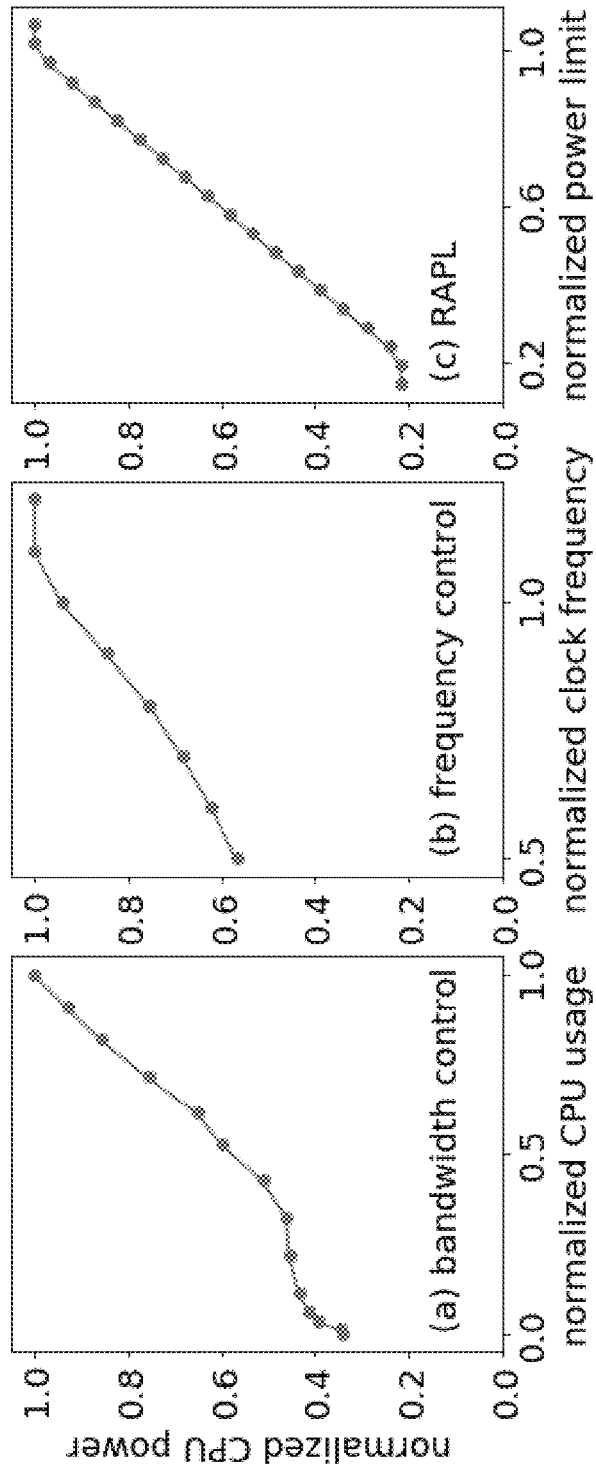
FIGS. 3A-C illustrates example results of running a workload according to aspects of the disclosure.

FIGS. 3A-C illustrate example results of running a workload that stresses the CPU and the memory to maximize power consumption. FIG. 3A illustrates the results using CPU bandwidth control, FIG. 3B illustrates the results using DVFS, and FIG. 3C illustrates the results using RAPL to limit CPU power. CPU power was normalized to the highest power observed when none of the power management mechanism was enabled. FIG. 3A shows that, with CPU Bandwidth Control, we are able to reduce CPU power to 34% of max due to significant CPU idle time from Bandwidth Control. In comparison, FIG. 3B shows that with DVFS, power consumption is still relatively high at 57% when the lowest frequency limit is applied. The clock frequency is normalized to the base frequency of the processor. The normalized frequency can be higher than 1.0 because CPU clock frequency can go above the base frequency when thermal and other conditions permit. Only part of the possible frequency range is shown in the graph. Due to the stress test nature of the workload, the highest observed clock frequency is close to the base frequency when no limit is applied. The top-right corner of the graph reflects that the frequency limit has to drop below the actual clock frequency to reduce power consumption.

FIG. 3C shows RAPL has the widest power reduction range among the three. It is able to reduce power to 22% of the max power. However, we noticed system management tasks were sluggish to respond when RAPL approached the lowest power limits, which suggests higher machine timeout risks if these limits were actually used in practice. By contrast, CPU Bandwidth Control only throttles throughput-oriented jobs and the system management tasks are not affected.

Example Application: Load Shaping Results

Figure 4:
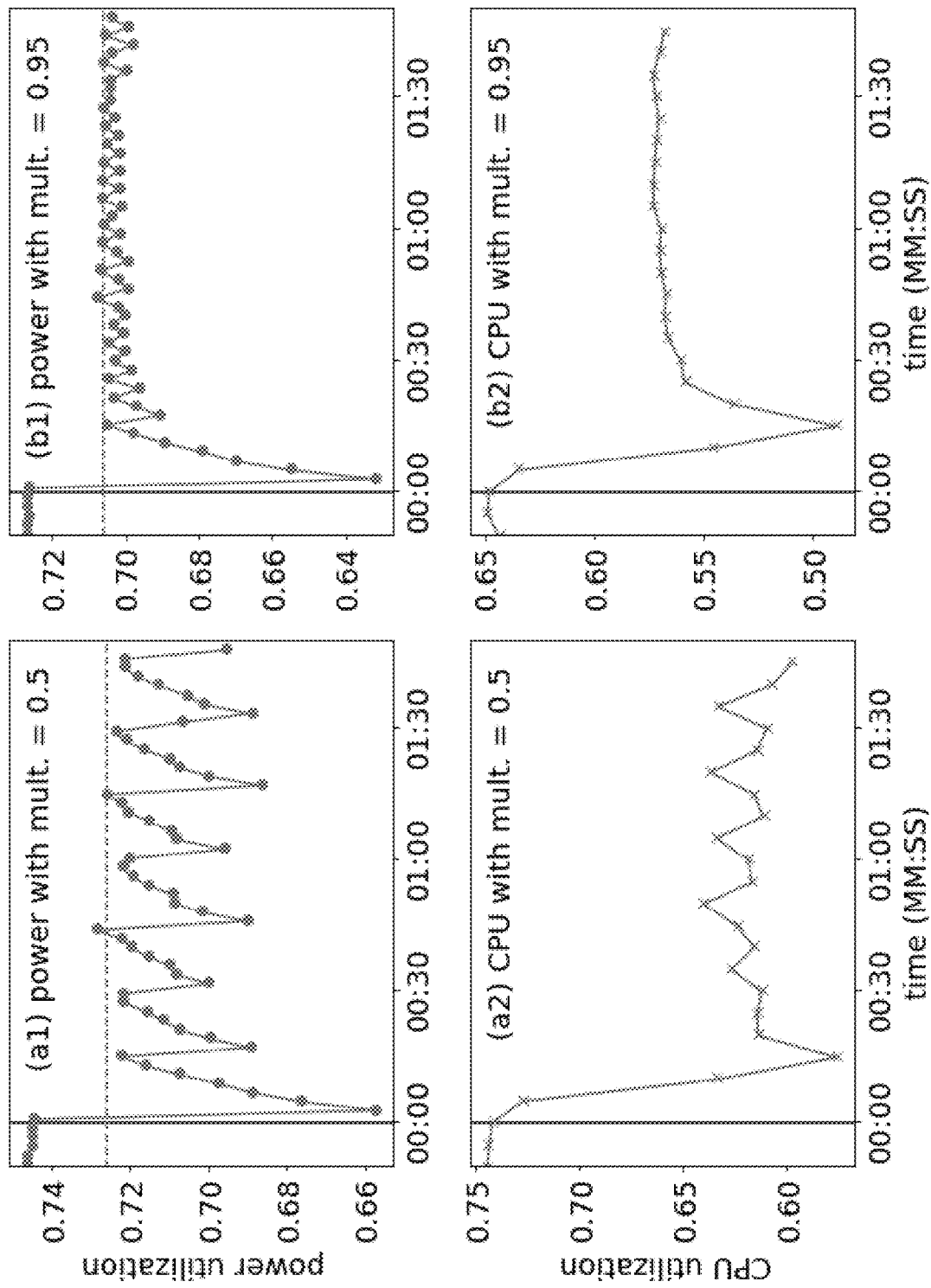
FIG. 4 provides graphs illustrating throttling triggered by various combinations of parameters, according to aspects of the disclosure.

FIG. 4 illustrates results of experiments performed in warehouse-sized data centers running production workloads. Throttling was manually triggered with various combinations of parameters. Power data is collected from data center power meters, which is exactly the data that the system also reads. The other metrics are sampled from individual machines and aggregated at the same power domain level corresponding to the power readings. Power measurement data is normalized to the power domain's equipment limit. Machine metrics such as CPU usage are normalized to the total capacity of all machines in the power domain unless specified otherwise. Task failures are normalized to the total number of affected tasks.

Load Shaping was triggered by manually lowering the higher power threshold to be just below the ongoing power consumption of a power domain. FIG. 4(a1) shows a typical Load Shaping pattern of power oscillating around the lower threshold. In seconds after throttling is triggered, power is reduced by a large margin because of the hard multiplier. Meanwhile the lower threshold is activated. Throttling is gradually lifted as power drops below the lower threshold, and power goes back up until it reaches the lower threshold. Then power is reduced again, but by a smaller margin because of the soft multiplier. The process continues as throttling is turned on and off repeatedly, resulting in power oscillating around the lower threshold. FIG. 4(b1), as compared to (a1), shows a soft multiplier closer to 1.0 leads to oscillations of a smaller amplitude, as expected. The latency from Load Shaping triggering to significant power reduction is less than 5 seconds. FIGS. 4(a2) and (b2) show the CPU utilization corresponding to (a1) and (b1) respectively. At the shown CPU utilization level, about 10% reduction of CPU utilization is needed to reduce 2% of power.

While tasks are slowed down, they should not fail because of CPU starvation or unexpected side effects.

One major merit of Load Shaping as compared to DVFS is that it can differentiate quality of service at cgroup level, allowing jobs with different SLOs to run on the same machine. Jobs may be classified into groups based on their priority, and Load-Shape the low-priority group while exempting the high-priority group.

Figure 5:
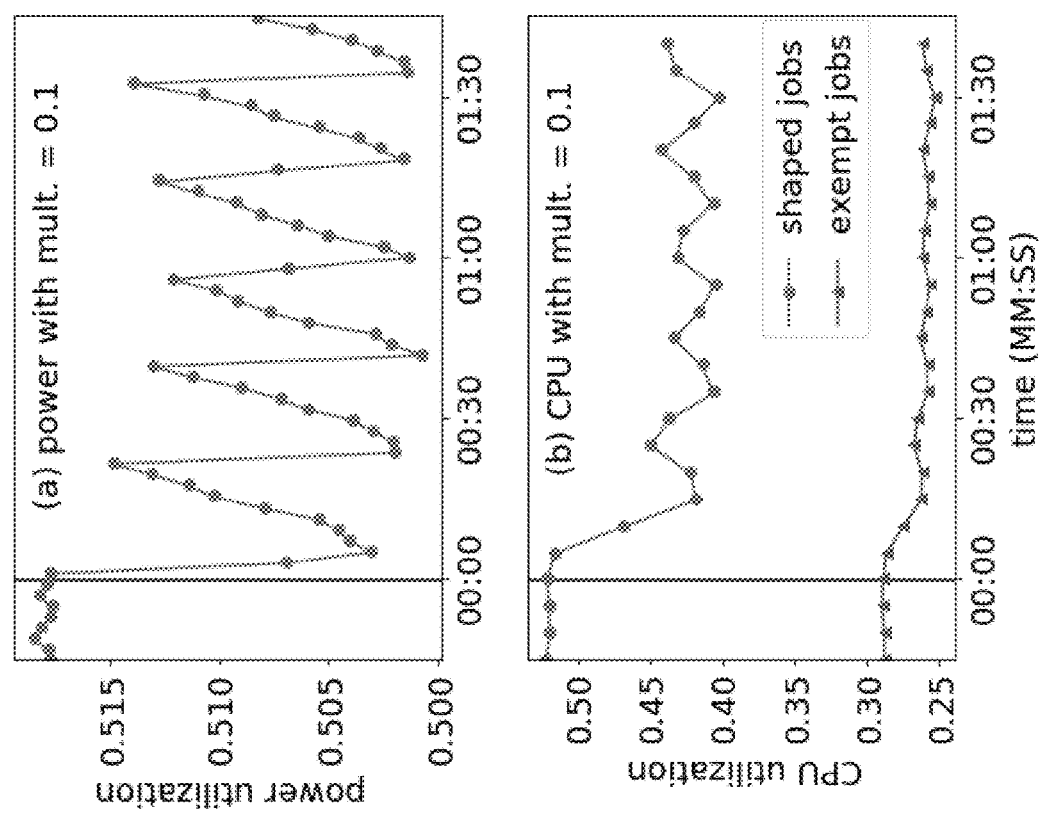
FIG. 5 provides graphs illustrating total power consumption and CPU usage according to aspects of the disclosure.

FIG. 5 shows the total power consumption and CPU usage of two groups of jobs during the event. The CPU usage of the Shaped and the exempt group is reduced by about 10% and 3%, respectively. The exempt group is indirectly affected because the jobs in the two groups are production jobs with complex interactions. One example is that a high-priority master job in the exempt group coordinates low-priority workers in the Shaped group, and the master job has less work to do and consumes less CPU while the workers are throttled. Nevertheless, the ability of Load Shaping to differentiate jobs is evident.

Load Shaping reduces power to the safe level just below a threshold and allows power to oscillate around it. However, in extreme cases where power stays above the threshold, the system will need to continuously reduce jobs' CPU bandwidth, eventually stopping the jobs from running. For example, power may remain high after throttling is triggered because new compute-intense jobs are continuously scheduled, or many high-priority jobs exempt from the mechanism spike in their CPU usage. In such cases it is the right tradeoff to stop the affected jobs in order to prevent power overloading.

Figure 6:
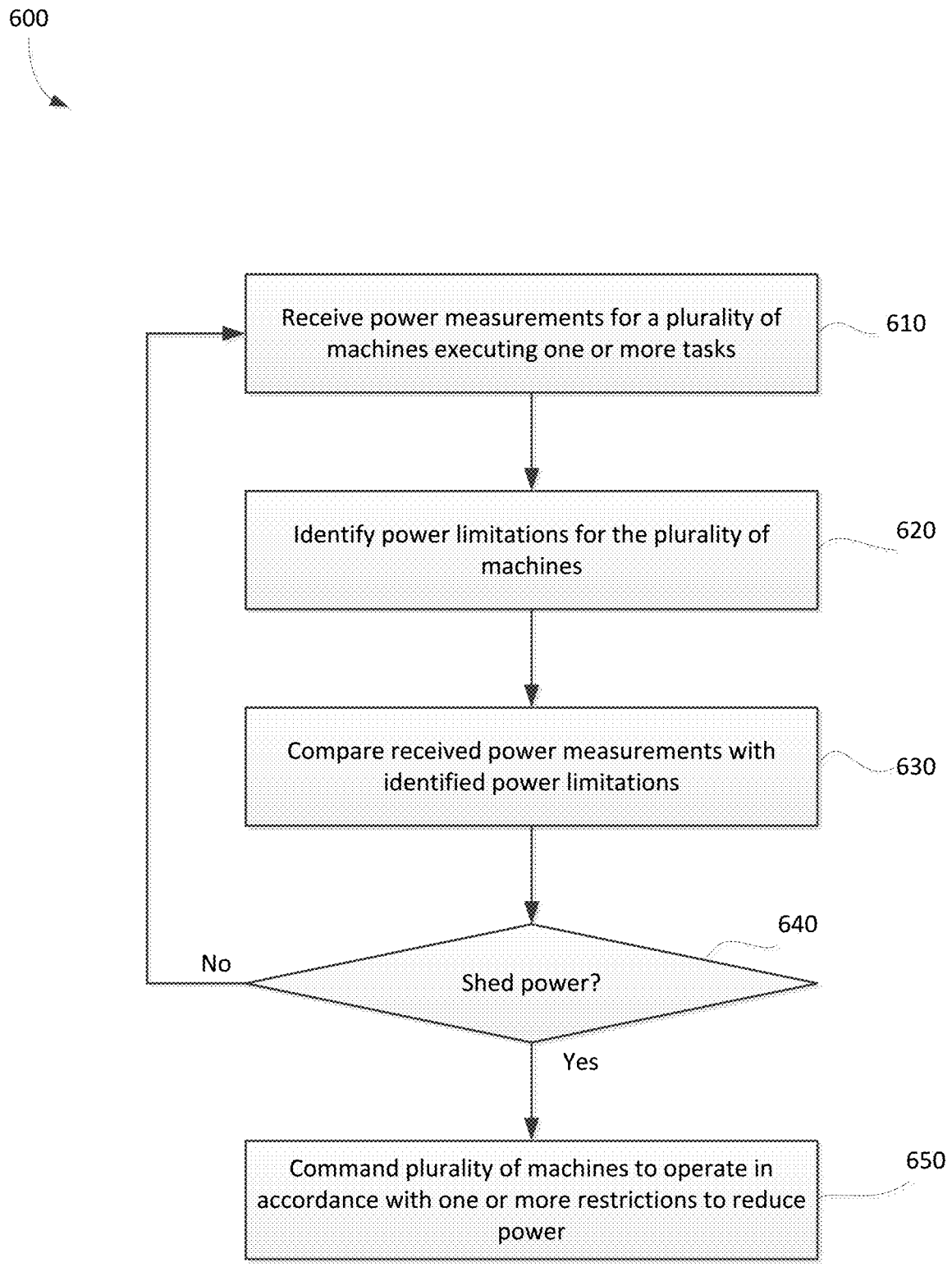
FIG. 6 is a flow diagram illustrating an example method according to aspects of the disclosure.

FIG. 6 is a flow diagram illustrating an example method 600 of loadshaping. While the operations are illustrated and described in a particular order, it should be understood that the order may be modified or operations may be performed simultaneously. Moreover, operations may be added or omitted.

In block 610, power measurements are received for a plurality of machines executing one or more tasks. The measurements may be received at, for example, a controller or other processing unit or collection of processing units. The measurements may be received directly from the plurality of machines, or through one or more intermediate devices, such as a power meter coupled to the plurality of machines. The plurality of machines may be, for example, computing devices in a datacenter. The plurality of machines may be executing one or more tasks or jobs.

In block 620, power limitations for the plurality of machines are identified. For example, the power limitations for each machine may be stored in a database, and the database may be accessed to identify the limitations for one or more particular machines.

In block 630, the received power measurements are compared with the identified power limitations. For example, the controller may determine whether the power measurements are close to the limits, such as whether the power measurements are within a predetermined range of the limit. According to some examples, one or more predefined thresholds may be set, wherein the comparison considers whether one or more of the thresholds have been reached. For example, a first threshold may be set at a lower level, such as a first percentage of the power limit, and a second threshold may be set at a higher level as compared to the first threshold, such as a second percentage of the power limit that is higher than the first percentage.

In block 640, it is determined, based on the comparison of the power measurements with the identified power limitations, whether to shed power consumed by the plurality of machines. By way of example, if one or more of the plurality of machines exceeds one or more predefined thresholds, it may be determined that power should be shed. According to a first example, such as illustrated in connection with FIG. 2A where both a high threshold and a low threshold are set, it may be determined whether either threshold has been reached. According to a second example, such as illustrated in connection with FIG. 2B where both a high threshold and a low threshold are set, it may first be determined only whether the high threshold is reached. Once the high threshold has been reached, triggering a responsive action, the low threshold may be activated for a predetermined time period. During that time period, it may be determined whether the low threshold has been reached, triggering a second responsive action. Once the time period expires, the low threshold may be deactivated and therefore no longer considered until the high threshold is reached again.

In block 650, if it is determined that power should be shed, a command may be sent to one or more of the plurality of machines, causing the one or more machines to operate in accordance with one or more restrictions to reduce power. For example, an RPC may be sent, the RPC including a multiplier for reducing the workload. For example, the multiplier may be a number between 0 and 1 that may be applied to a CPU limit, a sustained CPU rate, or a number of tasks, such as low priority tasks. Accordingly, when the multiplier is applied, the workload is reduced by a percentage corresponding to the multiplier.

In the example where multiple thresholds are set, different restrictions may be enforced based on which threshold is triggered. For example, triggering the higher threshold may cause a hard multiplier, such as a number closer to 1, to be sent, such that workload is significantly reduced. By the same example, triggering the lower threshold may cause a soft multiplier, such as a number closer to 0, to be sent such that the workload is less drastically reduced as compared to when the hard multiplier is applied.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
receiving, by one or more processors, power measurements for a plurality of machines in a datacenter, the plurality of machines executing one or more tasks;
identifying power limitations for the plurality of machines, including identifying a first threshold and identifying a second threshold higher than the first threshold;
determining whether to shed power consumed by the plurality of machines, comprising determining whether the received power measurements meet or exceed the second threshold;
commanding, by the one or more processors when the received power measurements meet or exceed the second threshold, the plurality of machines to operate in accordance with one or more restrictions to reduce power consumption below the first threshold;
determining, by the one or more processors, whether the received power measurements exceed the first threshold during a predetermined period of time after reducing power consumption below the first threshold; and commanding the plurality of machines to reduce power below the first threshold when the first threshold is met or exceeded during the predetermined period of time.

2. The method of claim 1, wherein commanding the plurality of machines to operate in accordance with one or more restrictions to reduce power consumption below the first threshold comprises sending a command to reduce power consumption by a first predetermined percentage.

3. The method of claim 2, wherein when the first threshold is met or exceeded during the predetermined period of time, the method further comprises sending a second command to the plurality of machines to reduce power consumption by a second predetermined percentage that is lower than the first predetermined percentage.

4. The method of claim 1, wherein the measurements are received from one or more power meters coupled to the plurality of machines.

5. The method of claim 1, wherein commanding the plurality of machines to operate in accordance with the one or more restrictions comprises restricting processing time of a task inside a machine level scheduler for all the machines in a power domain.

6. The method of claim 5, wherein restricting the processing time comprises applying a first multiplier for low priority tasks, wherein the first multiplier is selected to prevent the low priority tasks from running and consuming power.

7. The method of claim 6, further comprising applying a second multiplier for the low priority tasks.

8. The method of claim 6, further comprising exempting one or more high priority tasks from the limitations.

9. The method of claim 1, further comprising limiting a number of available schedulable processor entities to control power when the power measurements become unavailable.

10. The method of claim 1, wherein commanding the plurality of machines to operate in accordance with one or more restrictions comprises making a portion of processing components of each of the plurality of machines unavailable to tasks.

11. A system, comprising:
one or more processors in communication with a plurality of machines executing one or more tasks, the one or more processors configured to:
receive power measurements for the plurality of machines;
identify power limitations for the plurality of machines, including identifying a first threshold and identifying a second threshold higher than the first threshold;
determine whether to shed power consumed by the plurality of machines, comprising determining whether the received power measurements meet or exceed the second threshold;
command, by the one or more processors when the received power measurements meet or exceed the second threshold, the plurality of machines to operate in accordance with one or more restrictions to reduce power consumption below the first threshold;
determine whether the received power measurements exceed the first threshold during a predetermined period of time after reducing power consumption below the first threshold; and
command the plurality of machines to reduce power below the first threshold when the first threshold is met or exceeded during the predetermined period of time.

12. The system of claim 11, wherein commanding the plurality of machines to operate in accordance with one or more restrictions to reduce power consumption below the first threshold comprises sending a command to reduce power consumption by a first predetermined percentage.

13. The system of claim 12, wherein when the first threshold is met or exceeded during the predetermined period of time, the one or more processors are further configured to send a second command to the plurality of machines to reduce power consumption by a second predetermined percentage that is lower than the first predetermined percentage.

14. The system of claim 11, wherein the measurements are received from one or more power meters coupled to the plurality of machines.

15. The system of claim 11, wherein commanding the plurality of machines to operate in accordance with the one or more restrictions comprises restricting processing time of a task inside a machine level scheduler for all the machines in a power domain.

16. The system of claim 15, wherein in restricting the processing time the one or more processors are configured to apply a first multiplier for low priority tasks, wherein the first multiplier is selected to prevent the low priority tasks from running and consuming power.

17. The system of claim 16, wherein in restricting the processing time the one or more processors are configured to exempt one or more high priority tasks from the limitations.

18. The system of claim 11, wherein commanding the plurality of machines to operate in accordance with one or more restrictions comprises making a portion of processing components of each of the plurality of machines unavailable to tasks.

19. A non-transitory computer-readable medium storing instructions executable by one or more processors for performing a method, comprising:
receiving power measurements for a plurality of machines in a datacenter, the plurality of machines executing one or more tasks;
identifying power limitations for the plurality of machines, including identifying a first threshold and identifying a second threshold higher than the first threshold;
determining whether to shed power consumed by the plurality of machines, comprising determining whether the received power measurements meet or exceed the second threshold;
commanding, when the received power measurements meet or exceed the second threshold, the plurality of machines to operate in accordance with one or more restrictions to reduce power consumption below the first threshold;
determine whether the received power measurements exceed the first threshold during a predetermined period of time after reducing power consumption below the first threshold; and
command the plurality of machines to reduce power below the first threshold when the first threshold is met or exceeded during the predetermined period of time.

\* \* \* \* \*